Figure 4:
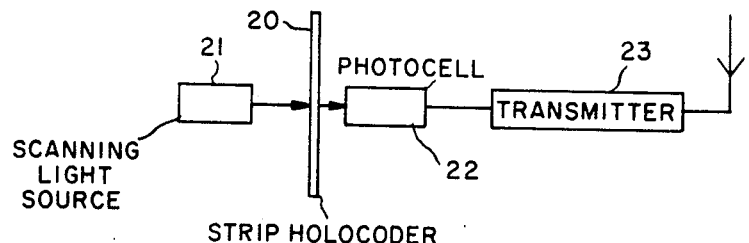

United States

[11] 3,608,993

[72] Inventor Dominick John De Bitetto
Briarcliff Manor, N.Y.
[21] Appl. No. 735,710
[22] Filed June 10, 1968
[45] Patented Sept. 28, 1971
[73] Assignee U.S. Philips Corporation
New York, N.Y.

[54] METHOD AND APPARATUS FOR THREE-DIMENSIONAL IMAGING
15 Claims, 9 Drawing Figs.

[52] U.S. Cl. .................................................. 350/3.5, 95/12.21
[51] Int. Cl. ................................................ G02b 27/22
[50] Field of Search ......................................... 350/3.5; 95/12.21

[56] References Cited
UNITED STATES PATENTS
3,515,452  6/1970  Pole .......................... 350/3.5
2,139,855  12/1938  Genies ....................... 95/12.21

OTHER REFERENCES
Jeong, J. Opt. Soc. Am. Vol. 57, pp. 1396–1398 (9/67).
Detoeuf, "Integral Photography," La Nature, 36th. year, No. 1817 pp. 252–254 (1908). [translated]
Pole, Applied Physics Letters, Vol. 10, No. 1, pp. 20–22 (1967).
Kock, Proceedings of the IEEE, pp. 1103–1104 (1967).
McCrickerd et al., Applied Physics Letters, Vol. 12, No. 1, pp. 10–12 (1968).

Primary Examiner—David Schonberg
Assistant Examiner—Robert L. Sherman
Attorney—Frank R. Trifari

ABSTRACT: A three-dimensional imaging system and method in which original image information is obtained in the form of a series of full-field two-dimensional image recordings from different directions in a common plane. The three-dimensional image can be reconstructed by conversion of the recordings to a strip hologram employing coherent light, by viewing the recordings with incoherent light by means of an optical system having a moving lens or mirror, or by means of an optical system including an autocollimating screen.

PATENTED SEP28 1971 3,608,993
SHEET 1 OF 3
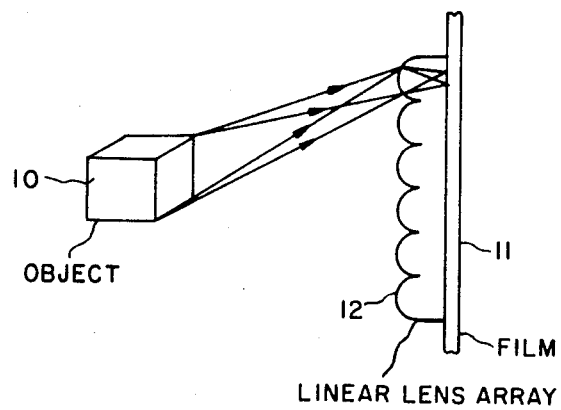
Fig. 1
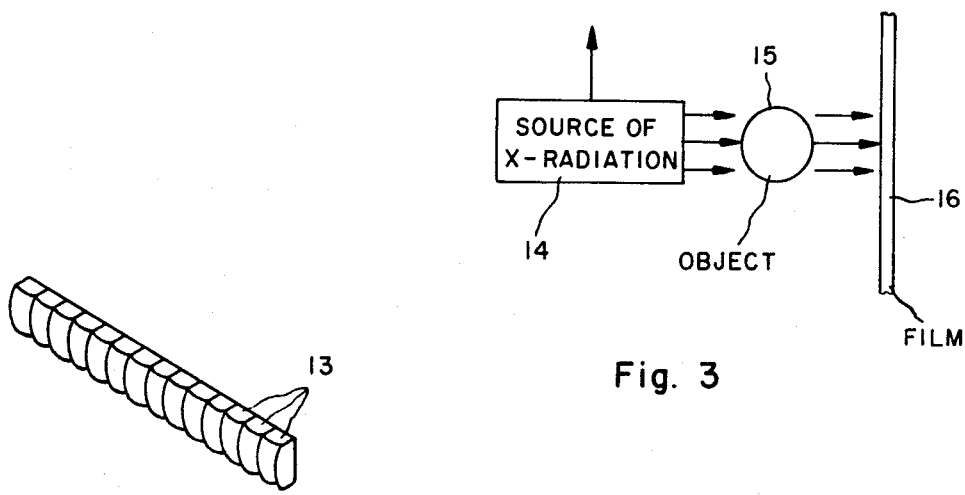
Fig. 3
Fig. 2
INVENTOR.
DOMINICK J. DeBITETTO
BY
AGENT

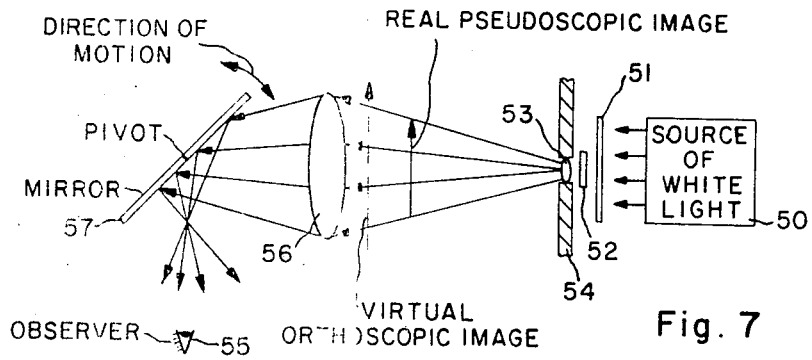
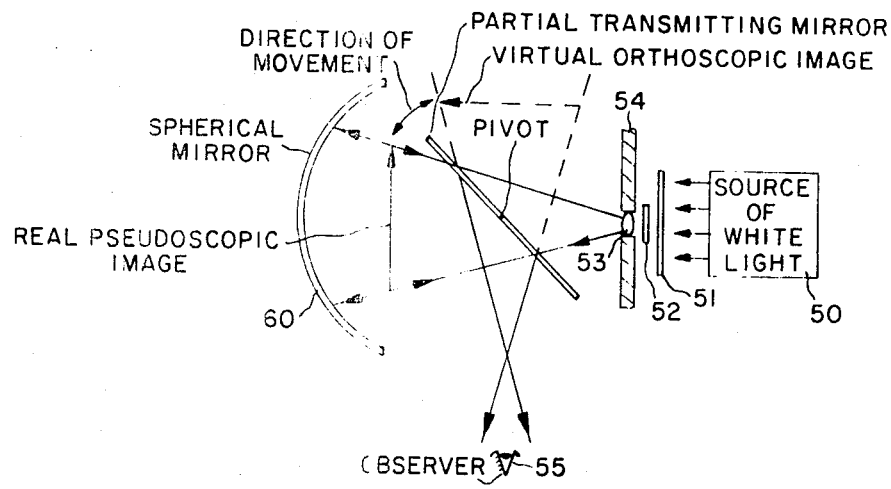
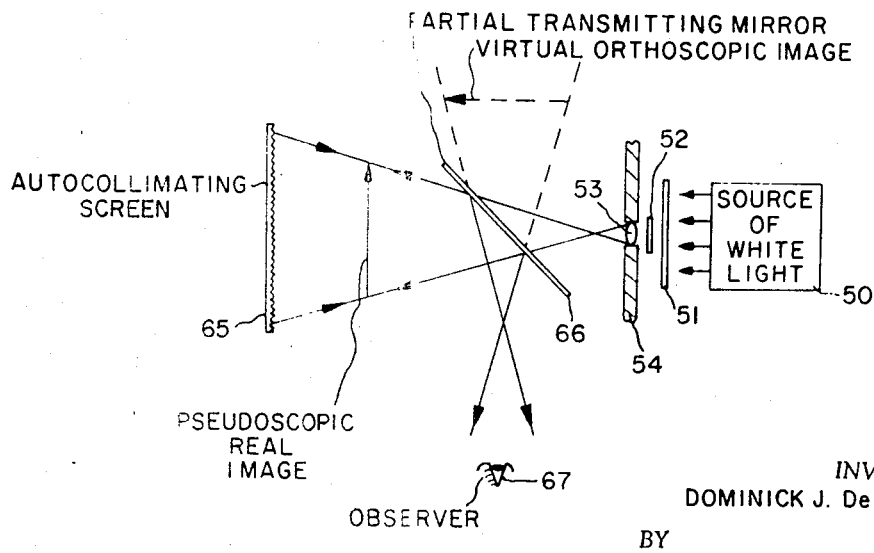

METHOD AND APPARATUS FOR THREE-DIMENSIONAL IMAGING

This invention relates to three-dimension imaging systems, and more in particular to a method and apparatus for reducing the space-spatial bandwidth of three dimensional images. In accordance with the invention, an original image is obtained without the use of coherent light, a reconstruction of the image may be performed by employing either coherent or incoherent light.

In the article "3-D Imagery And Holograms of Objects Illuminated In White Light," Applied Physics Letters, Vol 10 No. 1, Jan. 1, 1967, R. V. Pole discusses an imaging system in which a two-dimensional lens array (i.e. a fly's eye lens) is employed to direct white light from an object to a photographic plate. The resultant image produced on the plate contains practically all of the information that a Fresnel hologram of the same scene would include, but the image is in the form of a plurality of conventional two-dimensional images. As further pointed out by Pole, this multiple-image recording, which is called a "holocoder," can be converted to a hologram by projecting coherent light on a hologram plate by way of the holocoder and a fly's eye lens (aligned with respect to the holocoder in the same manner as during the production of the holocoder), and also projecting coherent reference radiation on the hologram plate.

While the above-described method for producing holograms has the advantage that the initial photographic record does not require coherent radiation, the space-spatial bandwidth of the arrangement is essentially the same as in conventional hologram imagery, and a two-dimensional fly's eyelens array with a minimum of inactive area is expensive and difficult to produce. (The lens described by Pole has a 5 to 1 ratio between inactive area and active area). As an example, a 3-inch by 3-inch plastic fly's eyelens with minimum inactive area may cost $1,000.

My copending U. S. Pat. application Ser. No. 700,948, filed Jan. 26, 1968, discloses a bandwidth reduction system for three-dimensional imaging in which a strip hologram is produced by employing coherent radiation, the strip hologram retaining substantial parallax and three-dimensional characteristics in only one direction. A satisfactory three-dimensional reconstruction of the image can be obtained with the strip hologram by a number of techniques, such as by forming a composite hologram from identical strip holograms, or by moving a single strip hologram. The reconstruction of the image in this system also generally requires the use of coherent radiation. The bandwidth reduction occurs as a result of the substantial elimination of parallax and three-dimensional characteristics of the image in one direction.

According to my present invention, bandwidth reduction in three-dimensional imagery is achieved, in a manner similar to that disclosed in my above-stated application, by substantially eliminating parallax and three-dimensional aspects to the image in one direction. In addition, the use of coherent radiation in forming the original image is obviated by employing a linear lens array (i.e. a single row of a fly's eye lens) to form a "strip holocoder." The image may be reconstructed either with a source of coherent light by an intermediate step of producing a strip hologram, or alternatively, the image may be reconstructed with incoherent light, employing a moving lens or mirror, or an autocollimating screen.

Figure 6:
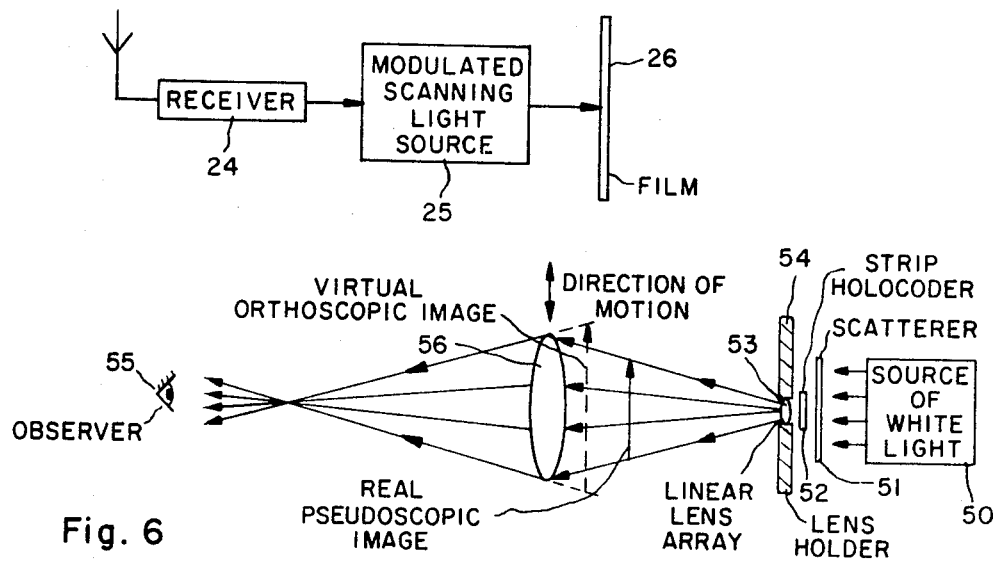
Figure 5:
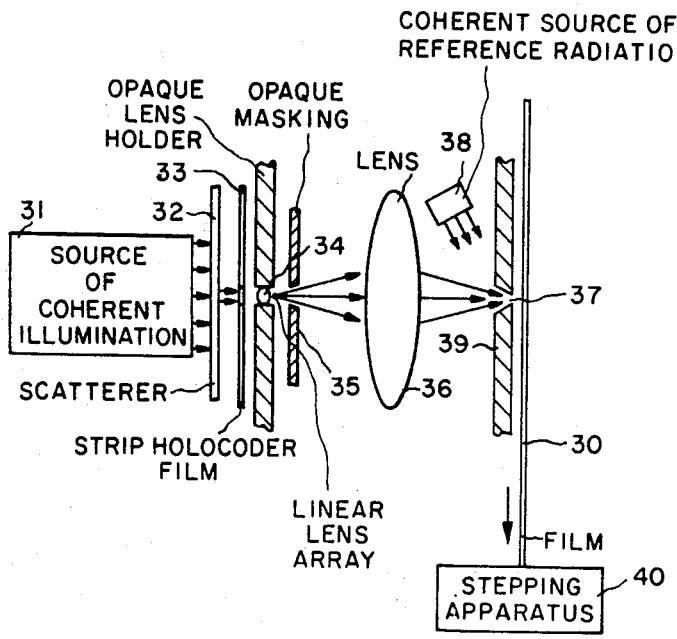

While the specification concludes with claims particularly pointing out and distinctly claiming the subject matter which I regard as my invention, it is believed that the invention will be better understood from the following description taken in connection with the accompanying drawings, in which:

FIG. 1 illustrates one arrangement for making a strip holocoder according to the invention;

FIG. 2 is a perspective view of the linear lens array which may be used in the systems of FIG. 1 and FIGS. 5-9, FIG. 3 illustrates a technique for forming a strip holocoder from X-ray shadowgraphs, FIG. 4 illustrates generally a manner in which information of a strip holocoder may be transmitted and received, FIG. 5 illustrates an image-reconstruction system for strip holocoders, employing coherent radiation, FIGS. 6-8 illustrate various image-reconstruction systems for strip holocoders using white light, in which an optical element of the system is oscillated, and FIG. 9 illustrates another image-reconstruction system for strip holocoders using white light, in which no moving optical elements are required.

In a first step according to a preferred method of the present invention, a first image is recorded on what may be called a strip holocoder. The strip holocoder is essentially a series of conventional two-dimensional image recordings of an object taken with incoherent radiation from different directions in a common plane. The image may be a permanent (i.e. fixed) image, such as an image photographically produced on a film, or it may be an image on the screen of the electronic scanning device such as the screen of a camera tube.

As an example, as shown in FIG. 1, white light reflected from an object 10 is focused on a photographic film 11 by way of a close-packed linear lens array 12, and then the film 11 is developed to produce the strip holocoder. The linear lens array is essentially a single row of lenslets of a conventional fly's eye lens array. An example of a linear lens array is illustrated in FIG. 2, in which a plurality of lenslets 13 are arranged in a single row. The linear lens array may consist, for example, of a row of small glass objective lenses ground on their edges to a generally square shape and cemented in a linear array in a metallic holder. In one example, 40 round selected lenses (0.2-inch diameter and 0.5-inch focal length) were ground to square shapes of about 0.1 inch on a side, and the lenses were then cemented in a closely packed linear array in a slot in a metal plate. Such a glass lens array is much easier and more economical to fabricate with a high ratio of active to inactive area, than a glass fly's eye lens array. Alternatively, of course, the linear lens array may be formed by other techniques, such as by molding a plastic lens array.

In the case of X-radiation, it is preferable that the strip holocoder by formed from a series of conventional shadowgraphs taken at different angles in a common plane, the shadowgraph then being assembled and (if necessary) reduced in size to form the linear strip holocoder. Thus, as shown in FIG. 3, X-radiation from a source 14 is directed through an object 15 to form a shadow-graph on a film or X-ray sensitive screen 16. The source 14 is movable to permit making a multiple series of shadowgraphs in different areas, and from different directions, on the film 16.

The three-dimensional image information on a strip holocoder formed by the above techniques contains all the information essential for three-dimensional reconstruction, although in a form somewhat different than that in a strip hologram such as disclosed in by copending U.S. Pat. application Ser. No. 700,948, and it is recorded with the advantage that incoherent radiation such as white light of conventional X-radiation is employed. This is particularly advantageous, for example, for imaging in nonlaboratory environments, where the use of coherent radiation is difficult if not impossible, and in X-radiation techniques where satisfactory coherent radiation is difficult to obtain.

While the strip holocoders may be employed directly in reconstruction of images, the reduction in space-spatial bandwidth achieved by the use of a single strip of images facilitates their transmission to other locations for reconstruction. As pointed out in my above application, in most viewing situations the loss of parallax and three-dimensional aspects in one direction is not disadvantageous since to a viewer in a stationary position (with eyes aligned in the plane of the strip) this loss in not apparent. The transmission of the images to remote locations may be accomplished by a number of means, and not material to the concepts of the present invention. Thus, for example, as shown in FIG. 4, individual picture elements of a strip holocoder 20 may be scanned by a scanning light source 21 to produce sequential electric signals from a photocell 22, the signals then being transmitted by a conventional wideband e.g. television) transmitter 23. For this purpose it may be desireable to photographically enlarge the images on the strip holocoder. When the image information has been obtained by taking a series of sequential images, as in the above-described X-ray technique, the full-size images produced may be directly conventionally transmitted without enlargement. The individual images of the strip holocoder may be sequentially transmitted. As pointed out above, the signals for transmission may also be sequentially formed by means of a camera tube which directly receives the image information in incoherent light reflected from the object.

The transmitted signals can be received in a conventional wideband (e.g. television) receiver 24, and employed to control a modulated scanning light beam from source 25 (e.g., a CRT). The light from source 25 may then be employed to expose a photographic film 26 to reconstruct the strip holocoder. If necessary, optical reduction of the output of the source 25, or photographic reduction of the images on the film 26 to another film may be employed in order to reproduce the strip holocoder to the desired degree for image reconstruction.

As pointed out by R. V. Pole in the above-cited article, a real three-dimensional image can be produced from an $n \times n$ array (i.e. square) of two-dimensional images (as produced by a conventional $n \times n$ fly's eye lens array) by employing a fly's eye lens and a developed photographic positive $n \times n$ holocoder in the same relative positions as during the original exposure of the holocoder, and exposing the assembly to incoherent light. The real 3D image may then be formed on a screen in the path of the reflected light. An image formed in this manner is not too satisfactory for most observational purposes, however, since at any given position of the screen only one plane of the object will be in focus. This is also generally true when a real image is reconstructed in the same manner with a strip holocoder and linear lens array.

In order to produce more directly viewable images, the above article discloses a technique for producing a hologram from the holocoder by placing a hologram plate anywhere between the holocoder and the position of the real image, and exposing the halogram plate to coherent radiation passing through the holocoder and the fly's eye lens array, and also to reference coherent radiation.

It has been found, however, that this information is not satisfactory for producing a hologram form a strip holocoder, This will be explained in more detail in the following paragraphs. Referring to FIG. 5, which illustrates a satisfactory conversion system for producing a hologram from a strip holocoder, the hologram film 30 is exposed by coherent radiation from a source 31 by way of an optical path which includes, in order, a scatterer 32, the strip holocoder 33, a linear lens array 34, an optical mask 35, lens 36, and slit 37. The film 30 is also exposed to reference coherent radiation, by way of slit 37, from a source 38, which is derived from the same source as radiation from source 31. The strip holocoder 33 is positioned, with respect to the linear lens array, in the same relative relationship that existed between the original strip holocoder and linear lens array during fabrication of the strip holocoder. Thus in FIG. 5 the strip extends normal to the plane of the drawing. When the original holocoder consists of a series of conventional full-size shadowgraphs or sequentially taken photographic images, the holocoder strip 33 produced therefrom by reduction is positioned so that the light passing through the separate adjacent images of the holocoder pass through separate adjacent lenslets. The mask 35 is provided to mask off inactive areas of the lenslets and may be eliminated if the inactive areas of the lens array is not substantial. Alternatively, the conversion of the holocoder images to their respective adjacent elemental holograms on the film 30 may be accomplished sequentially, in which case the position of each image in the holocoder strip 33 relative to its corresponding lenslet of the linear array is adjusted and recorded independent of the others. In this case, it is preferable that the slit 39 be replaced by a movable square aperture, e.g. 0.1-inch square. This variation reduces the problem of matching the spacing of the holocoder images to the linear lens array lenslets.

I will now discuss the proper position of the film 30 in order to obtain a useful hologram. In this regard, several possibilities exist. For example, the film 30 may be placed against or closely adjacent to the linear lens array. In this case, it is difficult to irradiate the film 30 with reference radiation to produce a surface hologram, but it is feasible to radiate form the back side of the film with reference radiation to produce a volume hologram. The resultant hologram will be a strip hologram, as discussed in my copending U.S. Pat. application Ser. No. 700,948, and a plurality of identical such strip holograms may be assembled in parallel relationship in a common plane to produce a composite (e.g., square) hologram that lacks parallax in one direction (i.e. normal to the lengthwise direction of the strips). Alternatively, a lens system such as lens 36 may be positioned between the lens array 34 and the film 30 so that the film is at a plane where the image of the strip holocoder is focused by the lens system. In this case, a surface strip hologram can be easily produced, and a plurality of identical such strips may be assembled ro form a composite hologram as discussed above. (For example, the film may be stepped by a suitable mechanism 40 to expose the identical strips on the same film in parallel relationship). In this arrangement the lens 36 is between the space of the real image and the holocoder strip 33. The slit (and slit assembly 39) are provided to avoid stray radiation from exposing portions of the film apart from the desired strip.

Assume, now, that the film 30 is placed between (e.g. midway between) the holocoder strip and the plane (planes) of the real image (i.e. the position of lens 36), as in the system of Pole, and that no slit is employed. A hologram can produced by this technique, but such a hologram has a limited value. While the hologram thus produced contains the image information of the strip holocoder, when viewed by an observer at a fixed location the reconstructed image seen by the observer is not the total image. Thus, if the strip holocoder corresponds to views of an object taken in a horizontal plane, the observer would see only a horizontal strip of the image, the portion of the object seen being a function of the viewing angle.

In the above technique for reconstructing an image from the strip holocoder it was necessary to produce a strip hologram employing coherent light, and to fabricate a composite hologram from parallel identical strip holograms. Possible disadvantages of these steps may be overcome by various techniques, as will be described with reference to FIGS. 6–9.

Referring now to FIGS. 6–9, in each of these viewing systems, white light form a source 50 is directed by way of a scatterer 51 and the strip holocoder 52 through the linear lens array 53. The lens array is held by a suitable opaque holder 54. The relative positions of the lens array 54 and holocoder 52 are the same as discussed with reference to FIG. 5.

In the arrangement of FIG. 6, the image is viewed by an observer at point 55, in line with light emanating from the lens array 53, with a lens 56 being positioned between the lens array 53 and the observer. If there is no relative movement between the observer and the optical system, and the observer is more than four times the focal distance of the lens 56 from lens array 53, the observer can view only a narrow strip of the total image. By oscillating the lens 56 in a plane normal to the optical axis of the system and parallel to the narrow dimension of the holocoder strip, however, it has been found that the entire reconstructed image, with full field, may be viewed by an observer at a fixed point. The position of the viewed virtual image is not noticeably affected by the motion of the lens 56, so there is no serious blurring of the image by this technique. The image, as in the case of the system of FIG. 5, has parallax in only one direction.

It is also to be noted that the problem of converting the real pseudoscopic image to a virtual orthoscopic image is accomplished by the use of the relatively large lens 56. The general positions of these images, which are inverted with respect to the image of the strip holocoder, are indicated (for one plane) in FIG. 6 between the lens 56 and lens array 53.

An alternative to the viewing technique of FIG. 6, is shown in FIG. 7. The movement of the lens 56 may be avoided by employing a pivoted mirror 57 in the path of the rays emanating from the lens 56. The mirror is provided with an oscillating movement about its axis, as indicated by the arrows in FIG. 7, in order to scan the image across the observation point, so that the observer sees the whole field of the image. Otherwise the system of FIG. 7 functions in the same manner as that of FIG. 6 as above described.

In another technique for viewing the image, as shown in FIG. 8, the lens 56 is replaced by a spherical mirror 60, and a 50 percent partially flat transmitting mirror 61 positioned between the mirror 60 and lens array 53. In this arrangement the mirror 61 is oscillated about an axis normal to the optical axis of the system, as shown by the arrows in FIG. 8, or alternatively by oscillating the mirror 60 about a pivot normal to the optical axis of the system. The positions of the real and viewed virtual image are indicated by the labeled arrows in the figure.

Still another system for reconstructing the image is illustrated in FIG. 9. This system avoids the necessity for providing movement to any part of the optical system for permitting observation of the entire image field by employing an autocollimating screen 65 positioned to receive and reflect light emanating from the lens array 53. Such a screen is described in U. S. Pat. No. 2,139,855, and may consist, for example, of a layer of small glass balls backed by a flat mirror, or small corner cubes. Such screens have the property that light received from any direction is reflected back in the same direction. A flat 50 percent partial transmitting mirror 66 is positioned at an angle to the optical axis between the screen 65 and the lens array 53 for directing light reflected from the screen to an observer at point 67. As in the arrangement of FIG. 8, the reconstructed virtual orthoscopic image appears in the line of sight of the observer on the other side of mirror 66. While autocollimating screens of the type employed for screen 65 have been suggested for image reconstruction from an $n \times n$ element holocoder and a fly's eye lens, I have found that such a screen also permits reconstruction of a total (square) image field using a strip holocoder and a linear lens array without requiring any scanning movement by the optical elements. This system thus permits reduced bandwidth imaging and image reconstruction using white light, without a complicated optomechanical system. The resultant image, as in the previously discussed systems, has parallax and three-dimensional characteristics in only one direction.

In the systems of FIGS. 6–9, the strip holocoders employed are in the form of developed film transparencies, and illumination is provided by a source of white light and a scatterer. As an alternative, this portion of the assembly may be replaced, for example, by a cathode-ray tube having its screen positioned in the location of the strip holocoder 52, and being provided with signals to produce the image of the strip holocoder on its screen. In this arrangement, the necessary incoherent radiation is provided by the cathode-ray tube.

It will be understood, of course, that while the forms of my invention herein shown and described constitute preferred embodiments of the invention, it is not intended herein to illustrate all of the equivalent forms or ramifications thereof. It will be obvious that modifications may be made without departing from the spirit or scope of the invention, and it is intended in the following claims to cover all such changes as fall within the true spirit and scope of the invention.

What I claim is:

1. A method of three-dimension imaging, comprising producing with incoherent radiation a real image series of an object in the form of a plurality of images corresponding to views of said object from different angles along a single line in a plane, projecting said image series by way of a linear lens array to an image plane, with each of said images being projected through a separate lenslet of said linear lens array, and projecting a substantially identical additional image series displaced from the first said series and oriented parallel to the first said series.

2. The method of claim 1 wherein said incoherent radiation is X-radiation, and said step of producing said image series comprises recording a transparent image series by X-ray shadowgraphs.

3. The method of claim 1 wherein said step of producing said image series comprises exposing a photographic film with incoherent radiation from an object by way of a single linear array of lenslets arranged in a plane parallel to the plane of said film and developing said film.

4. The method of claim 1 in which said image series is in the form of a single row of contiguous positive images, comprising providing a hologram plate at said image plane, said step of projecting said image series comprises projecting coherent radiation through said image series, linear lens array and an optical system, and exposing said hologram plate to coherent reference radiation simultaneously with said first-mentioned coherent radiation to produce a strip hologram.

5. The method of claim 4 comprising reproducing a plurality of identical said strip holograms, and assembling said strip holograms in parallel relationship to form a composite hologram.

6. The method of claim 1 wherein said step of projecting comprises projecting said image series with incoherent radiation through said linear lens array and an optical system, and wherein the step of projecting said additional image series comprises scanning the image field by continuously moving an element of said optical system whereby substantially the entire image of said object is visible.

7. The method of claim 6 wherein said optical system is a lens system, and said step of moving comprises reciprocating a lens of said lens system in a plane normal to the axis.

8. The method of claim 6 wherein said optical system comprises a lens system and a plane mirror arranged in that order with respect to the projection of the first said image series, and said step of moving comprises angularly rotating said mirror about a pivot point.

9. The method of claim 6 wherein said optical system comprises a partially transmitting mirror and a spherical mirror arranged in that order in the projection path of the first said image series, and said step of moving comprises angularly rotating said mirror about a pivot point.

10. The method of claim 1 wherein said steps of projecting comprise projecting the first said image series with incoherent radiation through said linear lens array, partially transmitting mirror arranged at an angle to the projection path, and reflecting the first image with an autocollimating screen arranged normal to the projection path, whereby radiation is reflected back from said screen to said mirror to produce said additional series whereby substantially the entire image of said object is visible.

11. A method for the transmission of three-dimensional images comprising producing a series of images of an object from different angles in a single line of a common plane with incoherent radiation, producing electric signals corresponding to said images, transmitting said electric signals, receiving said transmitting electric signals, converting said receiving said transmitting electric signals, converting said received signals to contiguous images corresponding to said series of images, projecting said contiguous images to an image plane by way of a linear lens array, and projecting a substantially identical additional image series displaced from the first said series and oriented parallel to the first said series, with each image of said contiguous images being projected through a separate lenslet of said linear lens array.

12. A system for reconstructing a three-dimensional image comprising a linear lens array, an optical system, an image plane, a first means for projecting an image through said lens array and optical system to said image plane with incoherent radiation, said image being in the form of a plurality of contiguous separate two-dimensional images corresponding to view of an object with incoherent radiation at different angles in a common plane, said separate images being aligned with separate lenslets of said linear lens array, and a second means for projecting a substantially identical image series displaced from the first said series and oriented parallel to the first said series.

13. The system of claim 12 wherein said second means comprises means for moving an element of said optical system whereby the entire image of said object becomes visible.

14. The system of claim 12 wherein said second means comprises an autocollimating screen positioned on one side of said linear lens array, and a partially transparent mirror positioned between said screen and linear lens array at an angle to the optical axis of said linear lens array, and wherein said first projecting means is positioned on the opposite side of said linear lens array, whereby the entire image of said object is visible at a viewing position in the path of light reflected from said mirror and screen.

15. The system of claim 12 wherein said means for projecting comprises a strip holocoder positioned with individual elements aligned with separate lenslets of said linear lens array, and a source of white light positioned to direct light through said strip holocoder, linear lens array and optical system to said image plane in that order.